US006651843B2

(12) United States Patent
Kowalsky et al.

(10) Patent No.: US 6,651,843 B2
(45) Date of Patent: Nov. 25, 2003

(54) METHOD AND APPARATUS FOR THE CONTROLLED SUPPLY OF FEEDSTOCK TO A FEEDSTOCK PROCESSING FACILITY OPERATING AT HIGH PRESSURE

(75) Inventors: Keith A. Kowalsky, East Norwich, NY (US); Daniel R. Marantz, Ocean Ridge, FL (US)

(73) Assignee: Flame-Spray Industries, Inc., Port Washington, NY (US)

( * ) Notice: Subject to any disclaimer, the term of this patent is extended or adjusted under 35 U.S.C. 154(b) by 48 days.

(21) Appl. No.: 10/012,093

(22) Filed: Nov. 13, 2001

(65) Prior Publication Data

US 2003/0089732 A1 May 15, 2003

(51) Int. Cl.$^{7}$ ................................................ G01F 11/00

(52) U.S. Cl. .......................... 222/1; 222/333; 222/504; 222/368; 222/636

(58) Field of Search .......................... 251/283; 222/636, 222/635, 216, 136, 367, 368, 376, 195, 333, 504, 410, 1; 264/4, 4.1, 1.36

(56) References Cited

U.S. PATENT DOCUMENTS 2,901,149 A * 8/1959 Richter ...................... 222/367
4,095,974 A * 6/1978 Matovich .................... 75/345
4,227,835 A * 10/1980 Nussbaum .................. 406/52
4,397,885 A * 8/1983 Akai et al. .................. 427/562
4,723,410 A * 2/1988 Otters ......................... 60/518
4,789,569 A * 12/1988 Douche et al. ............. 427/421
5,209,607 A * 5/1993 Wei et al. ..................... 406/66
5,273,584 A * 12/1993 Keller ........................ 118/692
5,302,414 A 4/1994 Alkhimov et al.
5,332,133 A * 7/1994 Murata et al. .............. 222/630
5,573,149 A * 11/1996 Saito .......................... 222/636
5,738,249 A 4/1998 Kikuchi et al.

* cited by examiner

*Primary Examiner*—Gene Mancene
*Assistant Examiner*—F. Nicolas
(74) *Attorney, Agent, or Firm*—Carmody & Torrance LLP

(57) ABSTRACT

A feedstock feeder for supplying feedstock to a system operating at a level of pressure. The feedstock feeder includes a pressure vessel having a pressure which is higher than the level of pressure; a mechanical feeder portion which meters the flow of feedstock to the system, the mechanical feeder portion located within the pressure vessel; a feedstock supplier which supplies feedstock to the mechanical feeder portion, the feedstock supplier located within the pressure vessel; a drive mechanism for driving a dynamically moving portion attached to the drive mechanism, the dynamically moving portion coupled to the mechanical feeder portion for moving the mechanical feeder portion; and wherein all dynamic seals operating to seal about the dynamically moving portion are positioned within the pressure vessel.

24 Claims, 3 Drawing Sheets

METHOD AND APPARATUS FOR THE CONTROLLED SUPPLY OF FEEDSTOCK TO A FEEDSTOCK PROCESSING FACILITY OPERATING AT HIGH PRESSURE

FIELD OF THE INVENTION

This invention relates to a method and apparatus for the metered supply of a feedstock such as a powder to a powder process operating at high pressures, such as for example a kinetic spray process or gas dynamic method for applying a coating as is described in U.S. Pat. No. 5,302,414.

BACKGROUND OF THE INVENTION

Powder feeders are employed in many different fields of technology, including plasma spray, petrochemical, kinetic spray, and others. Traditional mechanical delivery powder feeders include mechanical movement for the mechanical delivery of a powder or other feedstock such as a liquid slurry. As part of the mechanical action the feedstock is moved between moving surfaces such as rotating perforated disks, gear teeth, screws or vibrating canisters. For high-pressure mechanical feeders a feedstock is supplied to a stream of high-pressure gas.

In order to operate a kinetic spray process or gas dynamic method of applying a coating, it is required that a feedstock material which is in the form of a powder such as a pure metal, metal alloy or plastic (polymer) or ceramic (typically metal-oxides or metal-carbides) or any combination of the above, be supplied to the process as a stream of powder particles entrained in a carrier gas stream and where the pressure of the carrier gas stream is elevated usually significantly above ambient conditions. Typically the pressure of the carrier gas is between 300–500 psig (20 Bar to 35 Bar).

Known methods and apparatus for supplying a feed of powder particles, entrained in a stream of carrier gas generally are comprised of a canister which contains a supply of the powder and a mechanical mechanism for metering a continuous measured amount of the powder and entraining the powder particles into a carrier gas stream. This mechanical means can include an auger type screw, which is rotated by a motor drive connected to a dynamically moving shaft. Bearings are typically located on one or both sides of the shaft and these bearings must be kept free from powder particles. The motor and bearings make up the drive system for the mechanical powder feeder. The auger screw is located at the end of the shaft. This auger screw is positioned at the bottom of the canister and receives powder from the canister and is metered by the rate of rotation of the screw as well as the size of the screw. The powder from the rotating screw is delivered into a carburetor chamber where it is entrained in a stream of carrier gas. The canister and carburetor chamber are pressurized at usually about 10–20 psi higher than the pressure of the carrier gas. This pressure differential allows the powder to be fed into the main gas stream. A critical dynamic seal is positioned on the shaft between the pressure chamber created by the canister and carburetor and the drive system. This critical dynamic seal prevents the pressure from dropping in the pressure chamber and also prevents the powder material from getting into the bearings surrounding the shaft of the drive system.

Another mechanical means of delivering powder consists of a flat disc containing a series of holes located near the outer perimeter of the disc. This disc is located on an incline within a canister containing the powder. The disc is caused to rotate by a shaft and bearing system attached to a drive motor. As the disc rotates, powder fills the holes in the disc, which carries the powder to the upper portion of the canister where it exits the canister into a carburetor chamber where it is entrained into a carrier gas stream. The action in the carburetor chamber acts to distribute and entrain the powder particles uniformly in the carrier gas stream in both cases. The canister, disc and carburetor are pressurized to create a pressure chamber that prevents the powder from flowing back into the lower part of the canister. A critical dynamic seal is located typically on the shaft of the perforated rotating disc to prevent powder from leaving the mechanical moving portion or disc and getting into the drive system. The seal also maintains the pressure in the pressure chamber.

Another mechanical means consists of powder being fed from a pressurized canister into a continuous annular grove on a rotating metering plate. The rotating metering plate rotates within a chamber. The rotating metering plate and the plate chamber are also maintained at the same pressure as the canister. The rotating metering plate is attached to a shaft and a drive motor drives the shaft. A doctor member ensures that the powder is correctly filled into the groove. The powder is then sucked out of the groove after the plate has been mechanically rotated typically through a 180-degree angle, by a suction device, which has a projection extending into the groove. The powder thus sucked out of the groove leaves the powder feeder entrained in a carrier gas stream. A critical dynamic seal is positioned typically around the shaft to prevent the pressure from dropping and to prevent powder from falling into the drive system from the rotating metering plate and the plate chamber.

U.S. Pat. No. 5,738,249 describes a similar mechanical powder feeder that uses a rotating rotor having quantity measuring recessed parts for collecting powder dropped from a canister. The canister is pressurized and the glands or critical dynamic seals along the shaft of the rotor prevent the powder from falling into the drive system and also maintain the proper pressure in the pressure chamber created in the canister and rotor portion of the device.

The use of any of the above-mentioned mechanical means of powder feeding has the advantage that the means of precisely metering the powder feed rate is readily accomplishable. However, in order to employ any of these mechanical means of powder feeding in a high pressure system it is necessary to use rotating (dynamic) types of pressure and dust seals in order to maintain elevated gas pressures within the mechanical feeder portion and to keep powder from entering into bearing and drive areas. Typically these critical seals are located to block any of the feedstock from entering the drive components of the mechanical delivery powder systems.

FIG. 1 shows a prior art powder feeder system of U.S. Pat. No. 4,227,835 to Nussbaum. In this system a powder canister 15 contains powder. The powder is delivered to a rotating metering plate 1 which rotates within the plate chamber 24. A gas is fed into the powder canister 15 via a feed line 16. This gas pressurizes the powder canister 15 to prevent any dust or powder from blowing up into the canister 15. Critical dynamic seal 21 is positioned to permit the rotation of the metering plate 1 but prevents the powder from entering into the drive components such as the bearings 22 and the driving motor 23. This critical dynamic seal 21 has to function in a rather harsh environment being subjected to abrasive metallic and ceramic dust while also experiencing a pressure differential. This condition, when operating these types of powder feeders at high internal pressures of 20 Bar to 35 Bar tends to leads to early failure of the seals, allowing gas leaks to occur and powder particles to build-up around mechanically moving part of the feeder as well as getting into bearings, thus causing improper function of the powder feeder and resulting in significant downtime and high costs for maintenance. The known practice of employing any of the above mentioned mechanical metering powder feeders to high pressure processes such as kinetic spray is that the canisters are designed and constructed to withstand the 35 Bar pressure and all of the mechanical drive dynamic and static seals are designed and constructed with very special seals which are required to operate at up to 35 Bar pressure.

SUMMARY OF THE INVENTION

One aspect of the invention is to provide a method and apparatus for providing a metered supply of a feedstock at elevated pressures, for example between 20 Bar and 35 Bar, which permits reliable and accurately adjustable metering of the feedstock such as powders of different granulation, and continuous uniform feeding of a metered powder to a high pressure powder processing unit. Such a method and apparatus should not require any critical dynamic seal which must experience the pressure differential between the high pressure operation of the mechanical feeding mechanism and the lower ambient pressure surrounding the entire powder feeder thereby resulting in a highly reliable, relatively maintenance free operation.

According to one embodiment of the invention, there is provided an apparatus for the metered supply of powder to a powder-processing unit of the mechanically metered type, in order to provide uniform, precisely controlled powder feed rates. This powder feeder can for example be of any of the mechanically driven types as previously described herein. The mechanically driven powder feeder is enclosed within a pressure vessel with only a group of electrical connections being fed through the pressure vessel wall and requiring only a simple standard high pressure rated electrical feed-thru connector. A tube carrying the high-pressure carrier gas into the pressure vessel and a tube carrying the high pressure carrier gas with the powder entrained out of the pressure vessel and leading to the high pressure powder processing unit are also provided to and from the pressure vessel. In all cases, no critical dynamic seals are required but only simple static type seals are employed to seal off the electrical connections and powder feed hose connection leading from the pressure vessel. No critical dynamic seals are required on the motorized mechanical drives for the powder feeder since they are fully contained within the pressure vessel and are not subject the high differential pressures which they would otherwise be subject to in a more conventional adoption of the mechanical powder feeder for operation at high pressure. In addition there are no special requirements regarding the powder canister since it also is not subject to high-pressure differentials. In a preferred embodiment, the complete powder feeder including all mechanical mechanisms and the powder feed canister are all subjected to an equal pressure equal to that which is maintained within the pressure vessel.

Accordingly, it is an object of the invention to provide a powder feeder, for a system operating above ambient pressure, which has dynamic seals on the dynamically moving portions of the mechanical drives which do not experience a pressure differential.

It is a further object of the invention to provide a high-pressure powder feeder having the dynamic seal associated with preventing powder from leaving the mechanical feeding portion and getting into the drive system from having to operate under a pressure differential.

It is yet another object of the invention to provide a high-pressure powder feeder having the dynamic seal associated with the stirrer from having to operate under a pressure differential.

It is yet a further object of the invention to provide a pressure vessel having a substantially uniform pressure therein. The powder feeder mechanism and drive motors with all dynamic seals associated therewith are within the pressure vessel.

It is yet even a further object of the invention to provide a continuous feed system which isolates the seals associated with the mechanical feeder portion from operating under a pressure differential.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a better understanding of the invention, reference is made to the following drawings.

DETAILED DESCRIPTION OF THE EMBODIMENTS

Figure 1:
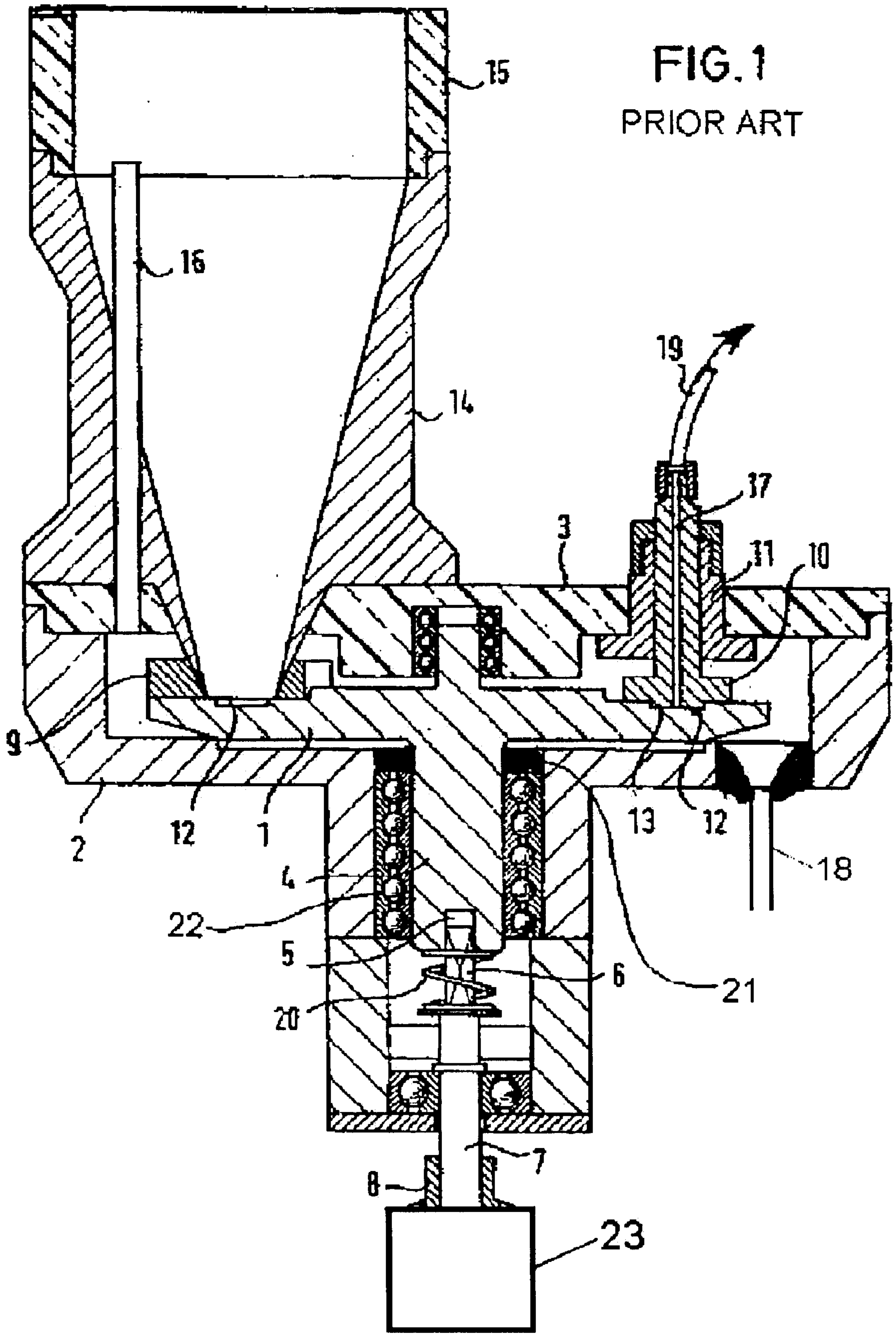
FIG. 1 PRIOR ART
FIG. 1 shows a prior art powder feeder.
Figure 2:
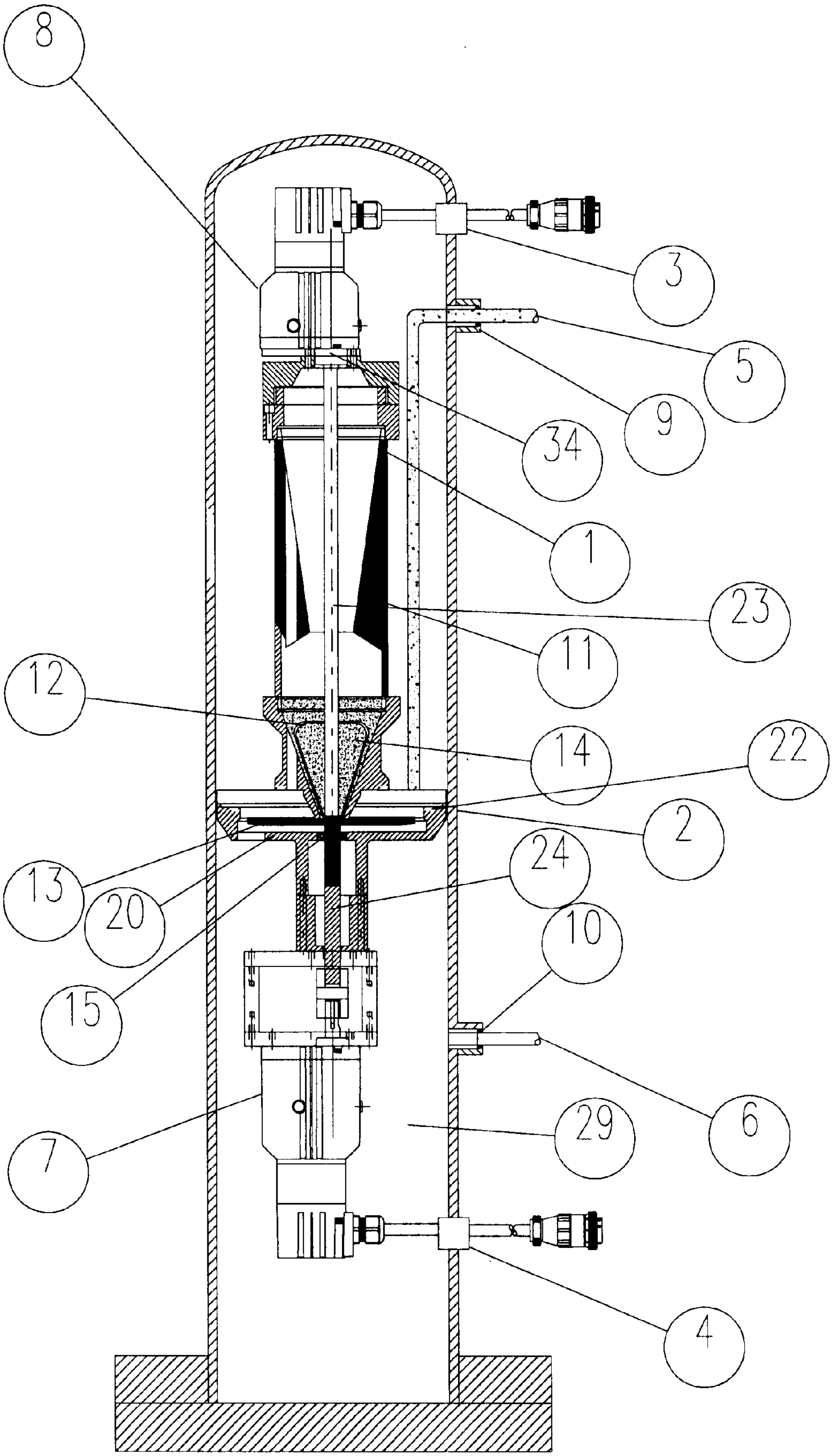
FIG. 2 is a diagrammatic illustration of a powder feeder employing a metering apparatus enclosed in a pressure vessel, in cross-section, which is the embodiment of the invention.

FIG. 2 illustrates an apparatus according to one embodiment of the invention, for the metered supply of powder to a high-pressure powder-processing unit. One type of mechanically metered powder feeder 1 is shown mounted in a pressure vessel 2 which is capable of withstanding high internal pressures, typically, up to 600 psig (35 Bar). Carrier gas at high pressure is fed into the pressure vessel 2 through the carrier gas inlet tube 6. The mechanically metered powder feeder consists of a powder canister 11, which contains the powder 14, and which is stirred be a stirrer 12. A gear head motor 8 rotates the stirrer 12. The powder 14 located in the canister 11, is delivered to a mechanical feeding mechanism which in this embodiment comprises a rotating disc 13, which carries the powder, in a groove, to a powder pick-up point and is carried away, entrained in a high-pressure carrier gas through the powder feed tube 5.

The carrier gas 29 enters the inlet 20 into the disc chamber 22 which is the area surrounding the rotating disc 13. Because the disc chamber 22 is at the same pressure as inside the pressure vessel 2, the dynamic seal 15 does not experience a pressure differential. In fact in this embodiment there are no dynamic seals associated with the mechanical feeder mechanism 13 that experience a pressure differential.

But most importantly seal 15, which operates to prevent the escape of powder into the gear motor 7, does not experience a pressure differential. In particular, seal 15 prevents powder from falling into the bearings surrounding the shaft 24 of the drive motor 7. Because seal 15 is subject to the harsh environment of powder particles, if it was also subject to high-pressure differentials it would lead to early failure of the seal causing powder to fall into the bearings which in turn causes early motor failure. Although powder can fall out of the inlet 20, it typically falls into the bottom of the pressure chamber and not into the bearings of the drive system where the powder can cause the most damage.

The carrier gas flows throughout the pressure vessel. Since the carrier gas is pressurized it flows easily out the outlet 5 of the pressure vessel to the high pressure system to which it is attached. The system attached to the pressure vessel operates at a pressure which is lower than the pressure within the pressure vessel. Typically the pressure differential is on the order of 1–3 atmospheres, but it can be any pressure differential which facilitates the flow of feedstock out of the feed tube 5.

The powder feed tube 5 is sealed by a static o-ring seal 9 as the tube passes through the outer wall of the pressure vessel 2. Similarly, a static o-ring seal 10 seals the carrier gas inlet tube 6 as it passes through the pressure wall. The rotating disc 13 is caused to rotate by means of a gear head motor 7. The gear head motor 7 includes a dynamically moving portion 24 such as a shaft or other device that operates to move the mechanical powder feeder portion in this case rotating disc 13. The area containing the rotating disc 13 is isolated from the supporting bearings and drive systems by means of the dynamic seal 15. The dynamic seal 15 must permit rotation or movement of the shaft 24 and prevent the flow of powder out of the mechanical feeder portion 13 and disc chamber 22. Gear head motor 8 drives a stirrer 12 which stirs the powder 14. The dynamically moving portion 23 of the gear head motor 8, in this case a shaft 23, also includes a dynamic seal 34. Both the gear head motor 7 and gear head motor 8 are enclosed in the pressure vessel 2 and therefore do not require high pressure rotary critical (dynamic) seals in order to commute the rotary power to the rotating disc 13 and the stirrer 12 respectively. The electrical leads for the control and powering of the gear head motors 7 and 8 are brought through the wall of the pressure vessel 2 through static type high pressure feed-thru connectors 4 and 3 respectively.

This device was found to reduce the failure rate of the seals associated with the shafts 23 and 24 on the powder feeder and resulted in a significant decrease in down time. In a preferred embodiment this system used with a kinetic spray device operating at approximately 300 psi had a pressure within the pressure vessel of 350 psi. Clearly these pressures could be varied.

Figure 3:
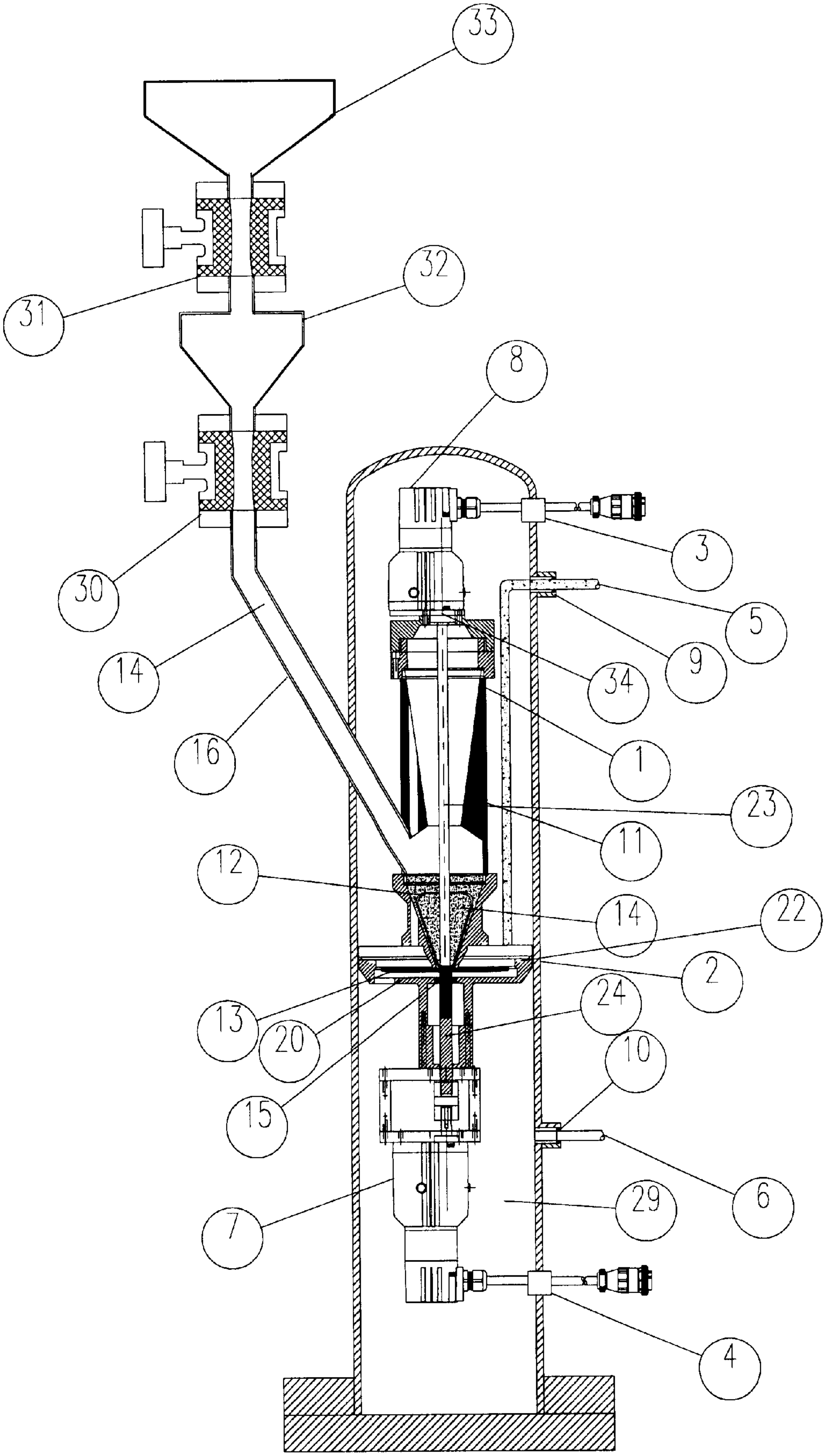
FIG. 3 is a diagrammatic illustration of a continuous feed powder feeder.

FIG. 3 shows a continuous feed powder feed system that includes a powder feed tube 16 as an inlet to the pressure vessel. Powder feed tube 16 is silicon, rubber or other type of tubing. Powder 14 flows into canister 11 when released by pinch valves 30 and 31. The dual pinch valve system 30 and 31 is used to adjust the pressure of the valve system and facilitate flow of powder into canister 11. If both valves 30 and 31 were to remain open during operation of the powder feeder, the powder 14 would flow from the high-pressure canister 11 into the outside canisters 32 and 33. If both valves 30 and 31 were to remain closed no powder would flow from canisters 33 and 32 into the high-pressure powder feeder system.

The operation of the continues feed system is as follows. A feedstock or powder is put in canister 33. Valve 31 is opened to allow the powder to fall into canister 32. Valve 31 is then closed and valve 30 is opened. The pressure of canister 32 is thus raised to the pressure inside the pressure vessel 2. And the powder 14 flows into the canister 11. Valve 30 is then closed and valve 31 is opened allowing move powder to enter canister 32. Valve 31 is closed again and valve 30 is opened allowing the powder in canister 32 to flow into the canister 11 of the pressure vessel. In a preferred embodiment the valves 30 and 31 of the valve system are pinch valves which squeeze the tubing together to stop the flow of powder.

Many other types of mechanically metered powder feeders can be used within the pressure vessel and still achieve the benefits of the application of this invention. It is also clear that this powder feeder can operated whenever metered powder must be supplied to a system operating at a higher pressure than the pressure seen by the mechanical feed portion. It is also noted that by eliminating the need for critical dynamic seals near the powder feeder mechanism, that is, seals which must experience a pressure differential, the system performance is enhanced.

Although the present invention has been described in detail, those skilled in the art should understand that they can make various changes, substitutions and alterations herein without departing from the spirit and scope of the invention in its broadest form.

What is claimed is:

1. A feedstock feeder for supplying feedstock to a system operating at a level of pressure, comprising:

a pressure vessel having a higher pressure than the level of pressure;

a mechanical feeder portion which meters the flow of feedstock to the system, the mechanical feeder portion located within the pressure vessel;

a drive mechanism coupled to a dynamically moving portion for driving the dynamically moving portion;

the dynamically moving portion coupled to the mechanical feeder portion operating to move the mechanical feeder portion, the dynamically moving portion located within the pressure vessel; and at least one dynamic seal positioned to permit the movement of the dynamically moving portion yet operating to prevent the feedstock from exiting the mechanical feeder portion, wherein all such dynamic seals are located entirely within the higher pressure of the pressure vessel.

2. A feedstock feeder for supplying feedstock to a system operating at a level of pressure, comprising:

a pressure vessel having a pressure which is higher than the level of pressure, the pressure vessel including an inlet for receiving a carrier gas, and an outlet for supplying feedstock in the carrier gas to the system;

a mechanical feeder portion which meters the flow of feedstock to the system, the mechanical feeder portion located within the pressure vessel;

a feedstock supplier which supplies feedstock to the mechanical feeder portion, the feedstock supplier located within the pressure vessel;

a drive mechanism for driving a dynamically moving portion attached to the drive mechanism, the dynamically moving portion coupled to the mechanical feeder portion for moving the mechanical feeder portion; and wherein all dynamic seals operating to seal about the dynamically moving portion are positioned entirely within the higher pressure of the pressure vessel.

3. A feedstock feeder for supplying feedstock to a high pressure system, comprising:

a pressure vessel having a pressure which is higher than the high pressure system;

a mechanical feeder portion which meters the flow of feedstock to the system, the mechanical feeder portion located within the pressure vessel;

a feedstock supplier for supplying feedstock to the mechanical feeder portion;

a drive mechanism for driving a dynamically moving portion attached to the drive mechanism, the dynamically moving portion coupled to the mechanical feeder portion for moving the mechanical feeder portion; and wherein all dynamic seals operating to seal the mechanical powder feeder portion and about the dynamically moving portion are positioned within the higher pressure of the pressure vessel such that the dynamic seals do not operate under a pressure differential.

4. A feedstock feeder for supplying feedstock to a high pressure system, comprising:

a pressure vessel having a pressure which is higher than the high pressure system, the pressure vessel including an inlet for receiving a carrier gas, and an outlet for supplying feedstock in the carrier gas to the system;

a mechanical feeder portion which meters the flow of feedstock to the system, the mechanical feeder portion located within the pressure vessel;

a feedstock supplier for supplying feedstock to the mechanical feeder portion;

a drive mechanism for driving a dynamically moving portion attached to the drive mechanism, the dynamically moving portion coupled to the mechanical feeder portion for moving the mechanical powder feeder portion; and wherein the dynamically moving portion and all dynamic seals associated therewith are positioned within the higher pressure of the pressure vessel such that the dynamic seals do not operate under a pressure differential.

5. A powder feeder, comprising:

a mechanical powder feeder portion for receiving a powder to be delivered to a system operating at a system pressure which is higher than ambient pressure;

a pressure vessel having a pressure which is higher than the system pressure, the pressure vessel housing the mechanical powder feeder portion;

a dynamically moving portion which moves the mechanical powder feeder portion, a drive motor for driving the dynamically moving portion;

a dynamic seal for sealing the powder in the mechanical powder feeder portion, the dynamic seal operating to seal around the dynamically moving portion yet permit movement of the dynamically moving portion; and wherein the drive motor, the dynamically moving portion and the dynamic seal are located within the pressure vessel such that they do not operate under a pressure differential.

6. A feedstock feeder for supplying feedstock to a system operating at a level of pressure, comprising:

a pressure vessel having a pressure which is higher than the level of pressure;

a mechanical powder feeder portion which meters the flow of powder to the system, the mechanical feeder portion located within the pressure vessel;

a feedstock canister which holds and supplies feedstock to the mechanical feeder portion;

a mixer for mixing the feedstock in the feedstock canister, the mixer being driven by a mixing motor including a dynamically moving mixing part and bearings, the dynamically moving mixing part for driving the mixer;

a first dynamic seal which seals around the dynamically moving mixing part keeping feedstock from entering the mixing motor bearings;

a drive mechanism which drives a dynamically moving portion coupled to the drive mechanism, the dynamically moving portion coupled to the mechanical feeder portion for moving the mechanical powder feeder portion, the dynamically moving portion including bearings;

a second dynamic seal operating to permit movement of the dynamically moving portion and seal the powder within the mechanical powder feeder portion so as to prevent powder from falling into the bearings; and wherein the first and second dynamic seals are located within the pressure vessel.

7. A continuous feed feedstock feeder for supplying feedstock to a system operating at a level of pressure, comprising:

a pressure vessel having a pressure which is higher than the level of pressure;

a mechanical feeder portion which meters the flow of feedstock to the system, the mechanical feeder portion located within the pressure vessel;

a feedstock canister which holds and supplies feedstock to the mechanical feeder portion;

a feedstock supply inlet which supplies powder from outside the pressure vessel into the canister;

a drive mechanism for driving a dynamically moving portion attached to the drive mechanism, the dynamically moving portion coupled to the mechanical feeder portion for moving the mechanical feeder portion;

a dynamic seal operating to permit movement of the dynamically moving portion and seal the feedstock within the mechanical powder feeder portion; and wherein all such dynamic seals are located entirely within the higher pressure of the pressure vessel.

8. A continuous feed powder feeder for supplying powder to a high pressure system, comprising:

a pressure vessel having a pressure which is higher than the high pressure system, the pressure vessel including an inlet for receiving a carrier gas, and an outlet for supplying powder in the carrier gas to the system;

a mechanical powder feeder portion which meters the flow of powder to the system, the mechanical powder feeder portion located within the pressure vessel;

a powder canister which holds and supplies powder to the mechanical powder feeder portion;

a powder supply inlet which supplies powder into the canister;

a valve system including a powder tube and a valve, the valve for controlling the feeding of powder into the pressure vessel;

a drive mechanism for driving a dynamically moving portion attached to the drive mechanism, the dynamically moving portion coupled to the mechanical powder feeder portion for moving the mechanical powder feeder portion;

a dynamic seal operating to seal around the dynamically moving portion and seal the powder within the mechanical powder feeder portion; and wherein all such dynamic seals are located within the pressure vessel and do not operate under a pressure differential.

9. A feedstock feeder for supplying feedstock to a system operating at a level of pressure, comprising:

a pressure vessel means having a pressure which is higher than the level of pressure, the pressure vessel means including inlet means for receiving a carrier gas, and outlet means for supplying feedstock in the carrier gas to the system;

a mechanical feeder portion means which meters the flow of feedstock to the system, the mechanical feeder portion means located within the pressure vessel means;

a feedstock supplier means which supplies feedstock to the mechanical feeder portion means, the feedstock supplier means located within the pressure vessel means;

a drive mechanism means for driving a dynamically moving portion means attached to the drive mechanism means, the dynamically moving portion means coupled to the mechanical feeder portion means for moving the mechanical feeder portion means; and wherein all dynamic seals operating to seal about the dynamically moving portion means are positioned entirely within the higher pressure of the pressure vessel means.

10. A feedstock feeder for supplying feedstock to a high pressure system, comprising:

pressure vessel means having a pressure which is higher than the high pressure system;

mechanical feeder portion means which meters the flow of feedstock to the system, the mechanical feeder portion means located within the pressure vessel means;

feedstock supplier means for supplying feedstock to the mechanical feeder portion means;

drive mechanism means for driving dynamically moving portion means attached to the drive mechanism means, the dynamically moving portion means coupled to the mechanical feeder portion means for moving the mechanical powder feeder portion means; and wherein the dynamically moving portion means and all dynamic seals associated therewith are located entirely within the higher pressure of the pressure vessel means.

11. A continuous feed feedstock feeder for supplying feedstock to a system operating at a level of pressure, comprising:

pressure vessel means having a pressure which is higher than the level of pressure;

mechanical feeder portion means which meters the flow of feedstock to the system, the mechanical feeder portion means located within the pressure vessel means;

feedstock canister means which holds and supplies feedstock to the mechanical feeder portion means;

feedstock supply inlet means which supplies powder from outside the pressure vessel means into the feedstock canister means;

drive mechanism means for driving dynamically moving portion means attached to the drive mechanism means, the dynamically moving portion means coupled to the mechanical feeder portion means for moving the mechanical feeder portion means;

dynamic seal means operating to permit movement of the dynamically moving portion means and seal the feedstock within the mechanical powder feeder portion means; and wherein all such dynamic seal means are located within the pressure vessel such that they do not operate under a pressure differential.

12. A method of supplying feedstock to a high pressure system, comprising the steps of:

pressurizing a vessel;

placing a feedstock feeder within the pressure vessel, the powder feeder including a mechanical feeder portion which meters the flow of feedstock to the system, the mechanical feeder portion located within the pressure vessel;

a feedstock supplier which supplies feedstock to the mechanical feeder portion, the feedstock supplier located within the pressure vessel;

a drive mechanism for driving a dynamically moving portion attached to the drive mechanism, the dynamically moving portion coupled to the mechanical feeder portion for moving the mechanical feeder portion; and wherein all dynamic seals operating to seal about the dynamically moving portion are positioned entirely within the higher pressure of the pressure vessel;

supplying a carrier gas to the pressure vessel;

feeding the feedstock via the powder feeder into the carrier gas within the pressure vessel; and supplying the feedstock entrained in the carrier gas to the high pressure system.

13. A feedstock feeder for supplying feedstock to a thermal spray system operating at a level of pressure, comprising:

a pressure vessel having a higher pressure than the level of pressure;

a mechanical feeder portion which meters the flow of feedstock to the system, the mechanical feeder portion located within the pressure vessel;

a drive mechanism coupled to a dynamically moving portion for driving the dynamically moving portion;

the dynamically moving portion coupled to the mechanical feeder portion operating to move the mechanical feeder portion, the dynamically moving portion located within the pressure vessel;

at least one dynamic seal positioned to permit the movement of the dynamically moving portion yet operating to prevent the feedstock from exiting the mechanical feeder portion, wherein all such dynamic seals are located entirely within the higher pressure of the pressure vessel; and an outlet for supplying feedstock to the thermal spray system.

14. A feedstock feeder for supplying feedstock to a thermal spray system operating at a level of pressure, comprising:

a pressure vessel having a pressure which is higher than the level of pressure, the pressure vessel including an inlet for receiving a carrier gas, and an outlet for supplying feedstock in the carrier gas to the system;

a mechanical feeder portion which meters the flow of feedstock to the system, the mechanical feeder portion located within the pressure vessel;

a feedstock supplier which supplies feedstock to the mechanical feeder portion, the feedstock supplier located within the pressure vessel;

a drive mechanism for driving a dynamically moving portion attached to the drive mechanism, the dynamically moving portion coupled to the mechanical feeder portion for moving the mechanical feeder portion;

wherein all dynamic seals operating to seal about the dynamically moving portion are positioned entirely within the higher pressure of the pressure vessel; and an outlet for supplying feedstock to the thermal spray system.

15. A feedstock feeder for supplying feedstock to a high pressure thermal spray system, comprising:

a pressure vessel having a pressure which is higher than the high pressure system;

a mechanical feeder portion which meters the flow of feedstock to the system, the mechanical feeder portion located within the pressure vessel;

a feedstock supplier for supplying feedstock to the mechanical feeder portion;

a drive mechanism for driving a dynamically moving portion attached to the drive mechanism, the dynamically moving portion coupled to the mechanical feeder portion for moving the mechanical feeder portion;

wherein all dynamic seals operating to seal the mechanical powder feeder portion and about the dynamically moving portion are positioned within the higher pressure of the pressure vessel such that the dynamic seals do not operate under a pressure differential; and an outlet for supplying feedstock to the high pressure thermal spray system.

16. A feedstock feeder for supplying feedstock to a high pressure thermal spray system, comprising:

a pressure vessel having a pressure which is higher than the high pressure system, the pressure vessel including an inlet for receiving a carrier gas, and an outlet for supplying feedstock in the carrier gas to the system;

a mechanical feeder portion which meters the flow of feedstock to the system, the mechanical feeder portion located within the pressure vessel;

a feedstock supplier for supplying feedstock to the mechanical feeder portion;

a drive mechanism for driving a dynamically moving portion attached to the drive mechanism, the dynamically moving portion coupled to the mechanical feeder portion for moving the mechanical powder feeder portion;

wherein the dynamically moving portion and all dynamic seals associated therewith are positioned within the higher pressure of the pressure vessel such that the dynamic seals do not operate under a pressure differential; and an outlet for supplying feedstock to the high pressure thermal spray system.

17. A powder feeder, comprising:

a mechanical powder feeder portion for receiving a powder to be delivered to a thermal spray system operating at a system pressure which is higher than ambient pressure;

a pressure vessel having a pressure which is higher than the system pressure, the pressure vessel housing the mechanical powder feeder portion;

a dynamically moving portion which moves the mechanical powder feeder portion, a drive motor for driving the dynamically moving portion;

a dynamic seal for sealing the powder in the mechanical powder feeder portion, the dynamic seal operating to seal around the dynamically moving portion yet permit movement of the dynamically moving portion;

wherein the drive motor, the dynamically moving portion and the dynamic seal are located within the pressure vessel such that they do not operate under a pressure differential;

an outlet for supplying the powder to the thermal spray system.

18. A feedstock feeder for supplying feedstock to a thermal spray system operating at a level of pressure, comprising:

a pressure vessel having a pressure which is higher than the level of pressure;

a mechanical powder feeder portion which meters the flow of powder to the system, the mechanical feeder portion located within the pressure vessel;

a feedstock canister which holds and supplies feedstock to the mechanical feeder portion;

a mixer for mixing the feedstock in the feedstock canister, the mixer being driven by a mixing motor including a dynamically moving mixing part and bearings, the dynamically moving mixing part for driving the mixer;

a first dynamic seal which seals around the dynamically moving mixing part keeping feedstock from entering the mixing motor bearings;

a drive mechanism which drives a dynamically moving portion coupled to the drive mechanism, the dynamically moving portion coupled to the mechanical feeder portion for moving the mechanical powder feeder portion, the dynamically moving portion including bearings;

a second dynamic seal operating to permit movement of the dynamically moving portion and seal the powder within the mechanical powder feeder portion so as to prevent powder from falling into the bearings;

wherein the first and second dynamic seals are located within the pressure vessel; and an outlet for supplying powder to a high pressure thermal spray system.

19. A continuous feed feedstock feeder for supplying feedstock to a thermal spray system operating at a level of pressure, comprising:

a pressure vessel having a pressure which is higher than the level of pressure;

a mechanical feeder portion which meters the flow of feedstock to the system, the mechanical feeder portion located within the pressure vessel;

a feedstock canister which holds and supplies feedstock to the mechanical feeder portion;

a feedstock supply inlet which supplies powder from outside the pressure vessel into the canister;

a drive mechanism for driving a dynamically moving portion attached to the drive mechanism, the dynamically moving portion coupled to the mechanical feeder portion for moving the mechanical feeder portion;

a dynamic seal operating to permit movement of the dynamically moving portion and seal the feedstock within the mechanical powder feeder portion;

wherein all such dynamic seals are located entirely within the higher pressure of the pressure vessel; and an outlet for supplying the feedstock to the thermal spray system.

20. A continuous feed powder feeder for supplying powder to a high pressure thermal spray system, comprising:

a pressure vessel having a pressure which is higher than the high pressure system, the pressure vessel including an inlet for receiving a carrier gas, and an outlet for supplying powder in the carrier gas to the system;

a mechanical powder feeder portion which meters the flow of powder to the system, the mechanical powder feeder portion located within the pressure vessel;

a powder canister which holds and supplies powder to the mechanical powder feeder portion;

a powder supply inlet which supplies powder into the canister;

a valve system including a powder tube and a valve, the valve for controlling the feeding of powder into the pressure vessel;

a drive mechanism for driving a dynamically moving portion attached to the drive mechanism, the dynamically moving portion coupled to the mechanical powder feeder portion for moving the mechanical powder feeder portion;

a dynamic seal operating to seal around the dynamically moving portion and seal the powder within the mechanical powder feeder portion;

wherein all such dynamic seals are located within the pressure vessel and do not operate under a pressure differential; and an outlet for supplying the powder to the high pressure thermal spray system.

21. A feedstock feeder for supplying feedstock to a thermal spray system operating at a level of pressure, comprising:

a pressure vessel means having a pressure which is higher than the level of pressure, the pressure vessel means including inlet means for receiving a carrier gas, and outlet means for supplying feedstock in the carrier gas to the system;

a mechanical feeder portion means which meters the flow of feedstock to the system, the mechanical feeder portion means located within the pressure vessel means;

a feedstock supplier means which supplies feedstock to the mechanical feeder portion means, the feedstock supplier means located within the pressure vessel means;

a drive mechanism means for driving a dynamically moving portion means attached to the drive mechanism means, the dynamically moving portion means coupled to the mechanical feeder portion means for moving the mechanical feeder portion means;

wherein all dynamic seals operating to seal about the dynamically moving portion means are positioned entirely within the higher pressure of the pressure vessel means; and an outlet for supplying the feedstock to the thermal spray system.

22. A feedstock feeder for supplying feedstock to a high pressure thermal spray system, comprising:

pressure vessel means having a pressure which is higher than the high pressure system;

mechanical feeder portion means which meters the flow of feedstock to the system, the mechanical feeder portion means located within the pressure vessel means;

feedstock supplier means for supplying feedstock to the mechanical feeder portion means;

drive mechanism means for driving dynamically moving portion means attached to the drive mechanism means, the dynamically moving portion means coupled to the mechanical feeder portion means for moving the mechanical powder feeder portion means;

wherein the dynamically moving portion means and all dynamic seals associated therewith are located entirely within the higher pressure of the pressure vessel means; and an outlet for supplying the feedstock to the high pressure thermal spray system.

23. A continuous feed feedstock feeder for supplying feedstock to a thermal spray system operating at a level of pressure, comprising:

pressure vessel means having a pressure which is higher than the level of pressure;

mechanical feeder portion means which meters the flow of feedstock to the system, the mechanical feeder portion means located within the pressure vessel means;

feedstock canister means which holds and supplies feedstock to the mechanical feeder portion means;

feedstock supply inlet means which supplies powder from outside the pressure vessel means into the feedstock canister means;

drive mechanism means for driving dynamically moving portion means attached to the drive mechanism means, the dynamically moving portion means coupled to the mechanical feeder portion means for moving the mechanical feeder portion means;

dynamic seal means operating to permit movement of the dynamically moving portion means and seal the feedstock within the mechanical powder feeder portion means;

wherein all such dynamic seal means are located within the pressure vessel such that they do not operate under a pressure differential; and an outlet for supplying the feedstock to the thermal spray system.

24. A method of supplying feedstock to a high pressure thermal spray system, comprising the steps of:

pressurizing a vessel;

placing a feedstock feeder within the pressure vessel, the powder feeder including a mechanical feeder portion which meters the flow of feedstock to the system, the mechanical feeder portion located within the pressure vessel;

a feedstock supplier which supplies feedstock to the mechanical feeder portion, the feedstock supplier located within the pressure vessel;

a drive mechanism for driving a dynamically moving portion attached to the drive mechanism, the dynamically moving portion coupled to the mechanical feeder portion for moving the mechanical feeder portion; and wherein all dynamic seals operating to seal about the dynamically moving portion are positioned entirely within the higher pressure of the pressure vessel;

supplying a carrier gas to the pressure vessel;

feeding the feedstock via the feedstock feeder into the carrier gas within the pressure vessel; and supplying the feedstock entrained in the carrier gas to the high pressure thermal spray system.

* * * * *